March 30, 1937. A. PODEL 2,075,054
SEALING MACHINE
Filed Dec. 29, 1933 8 Sheets—Sheet 2
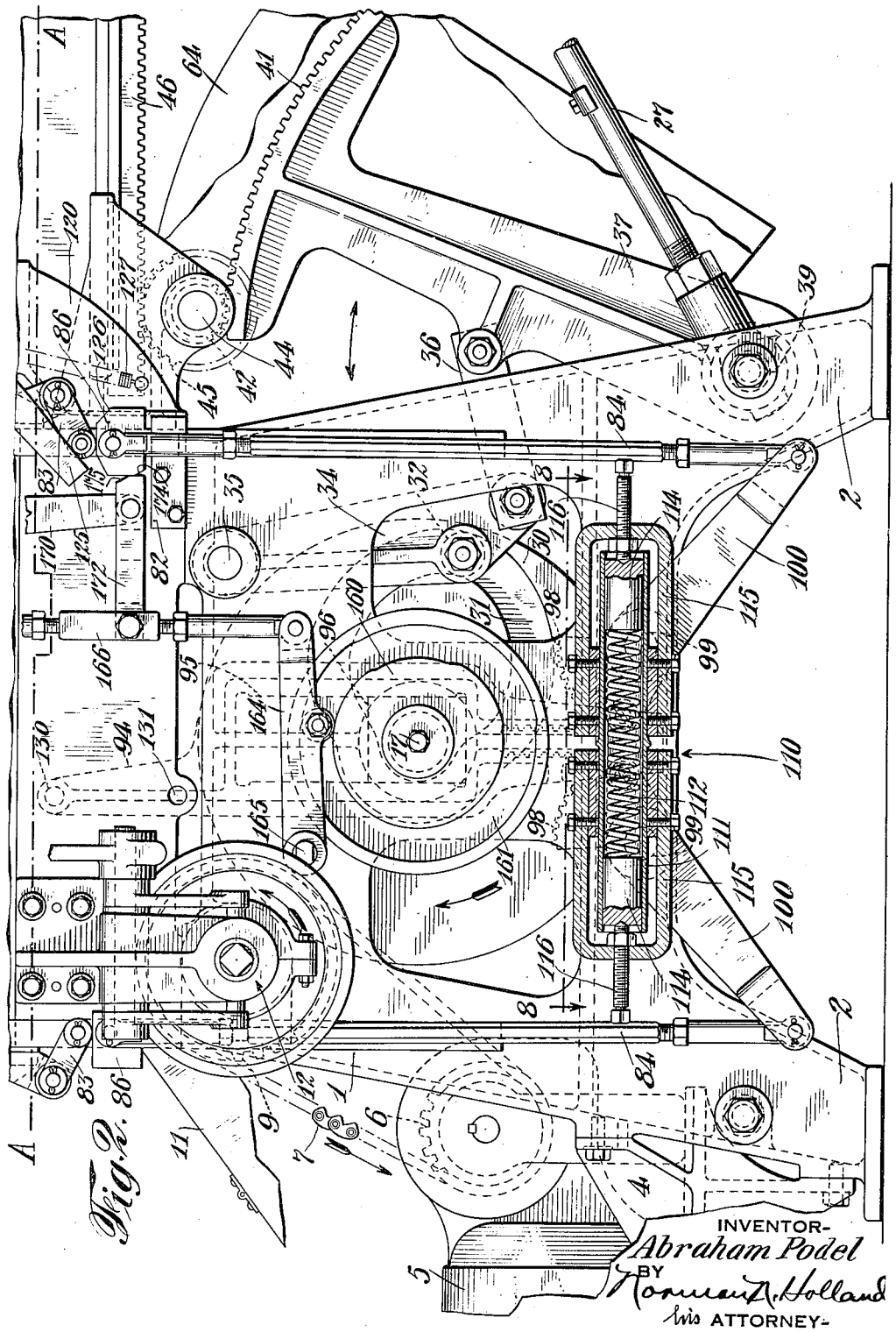
INVENTOR-
Abraham Podel
BY
Norman N. Holland
his ATTORNEY-

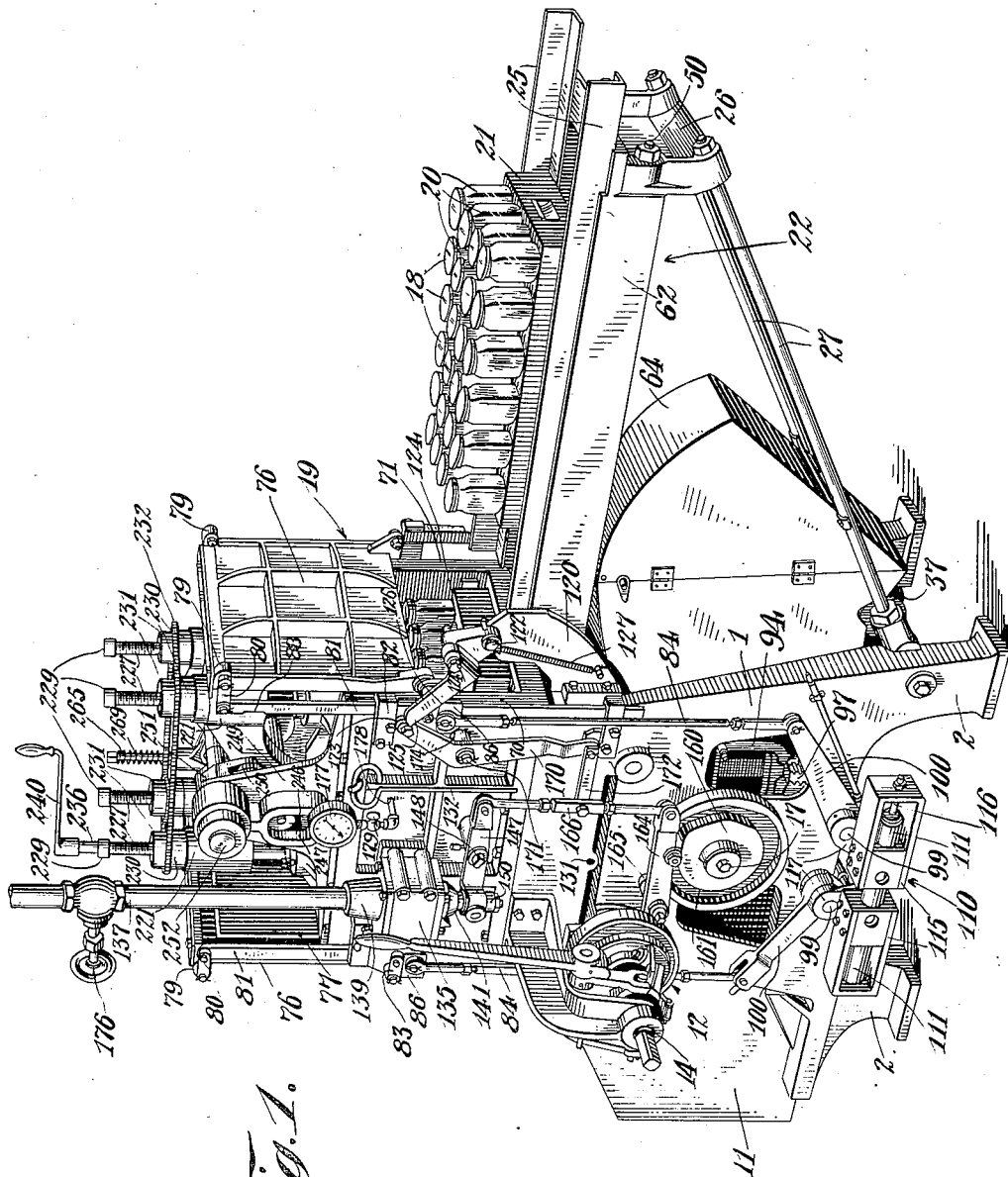

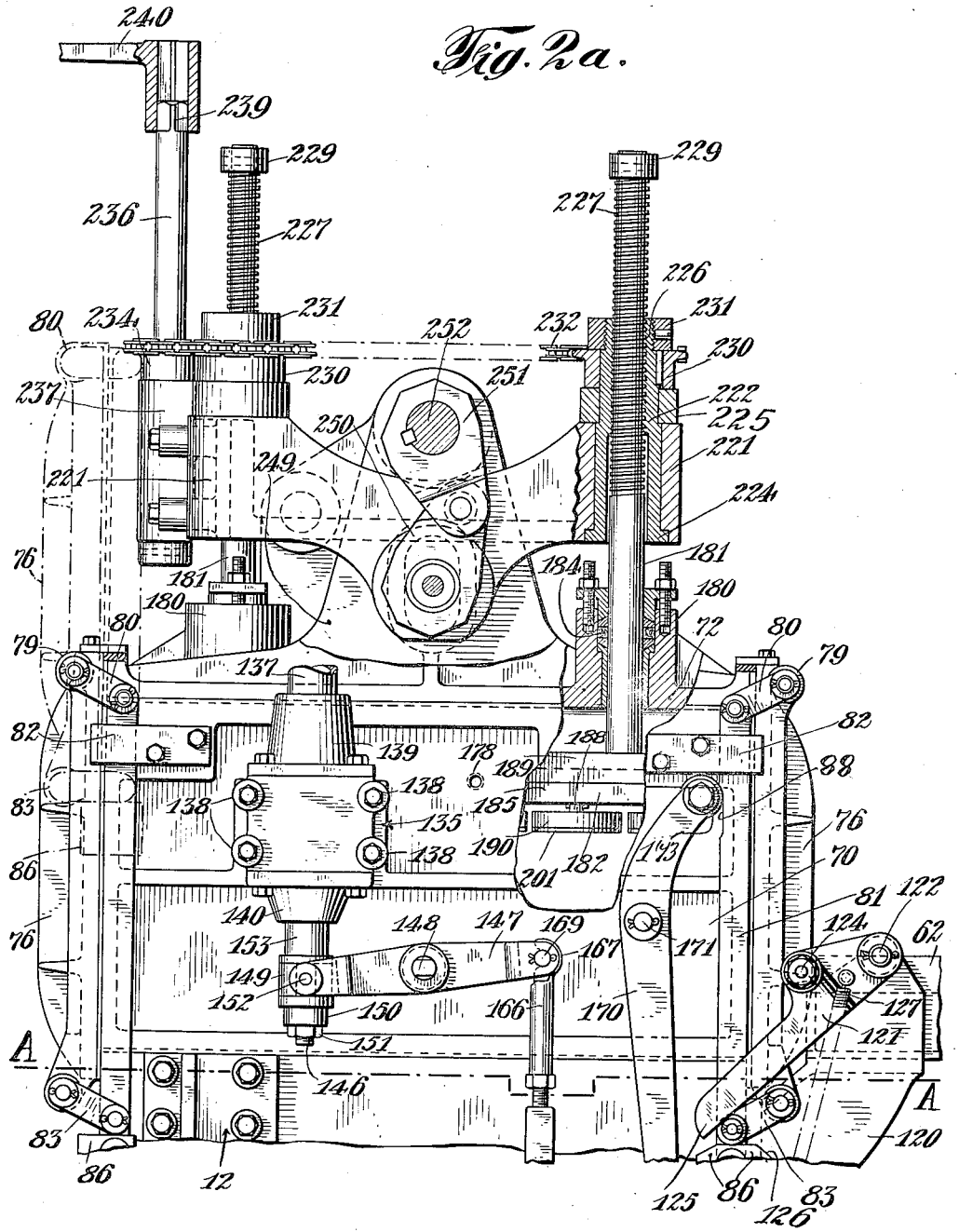

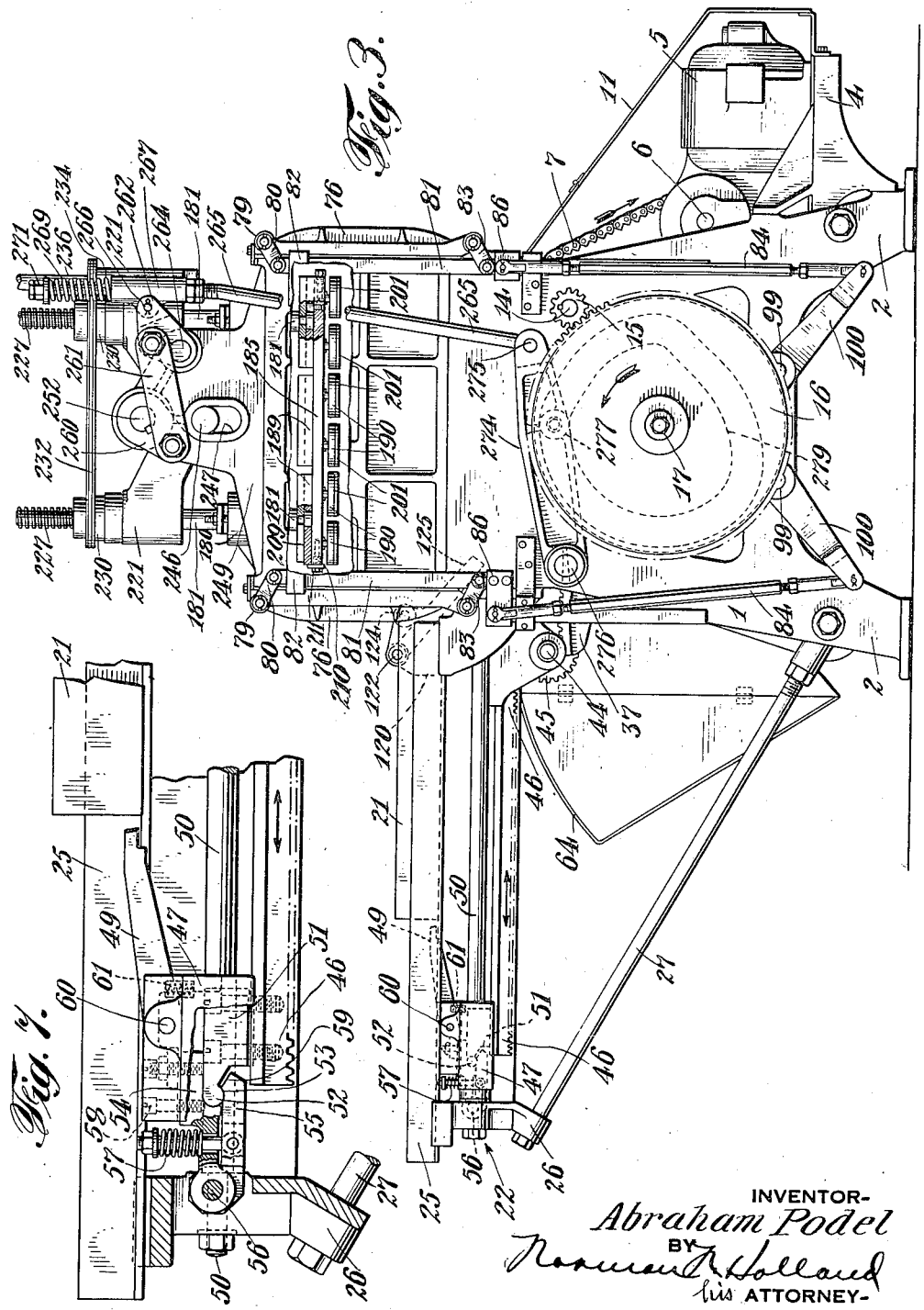

March 30, 1937.  A. PODEL  2,075,054
SEALING MACHINE
Filed Dec. 29, 1933  8 Sheets-Sheet 5
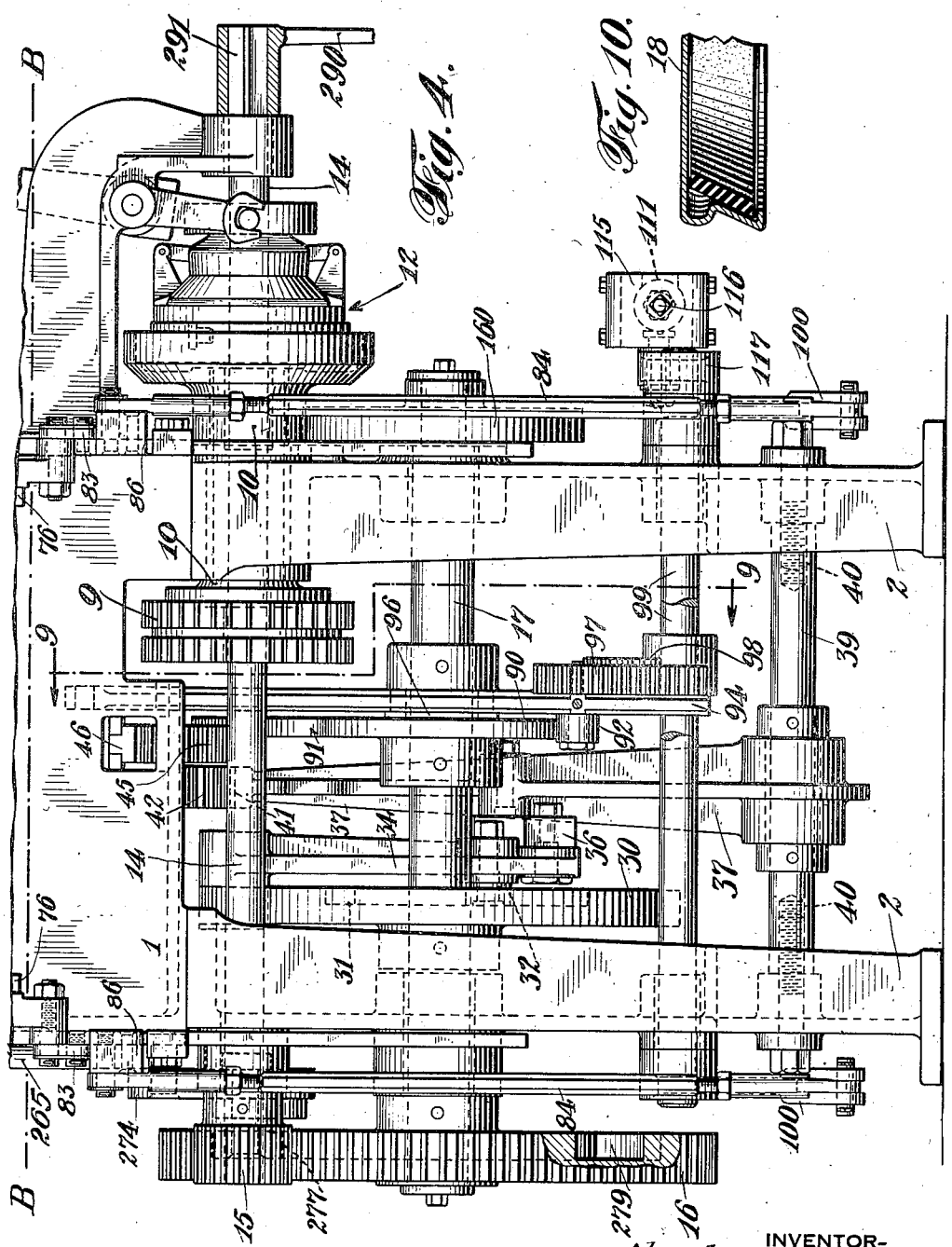
INVENTOR-
Abraham Podel
BY
his ATTORNEY-

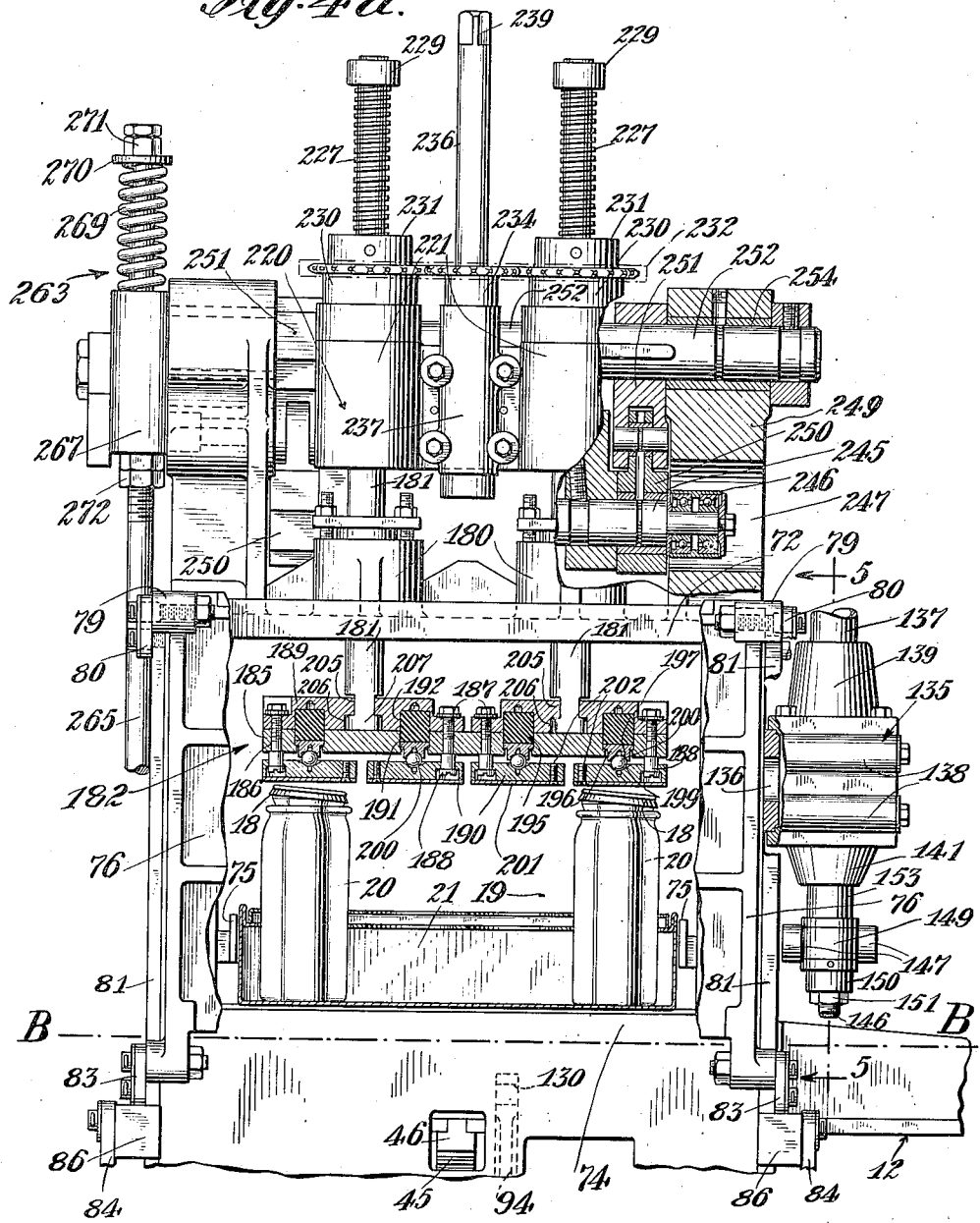

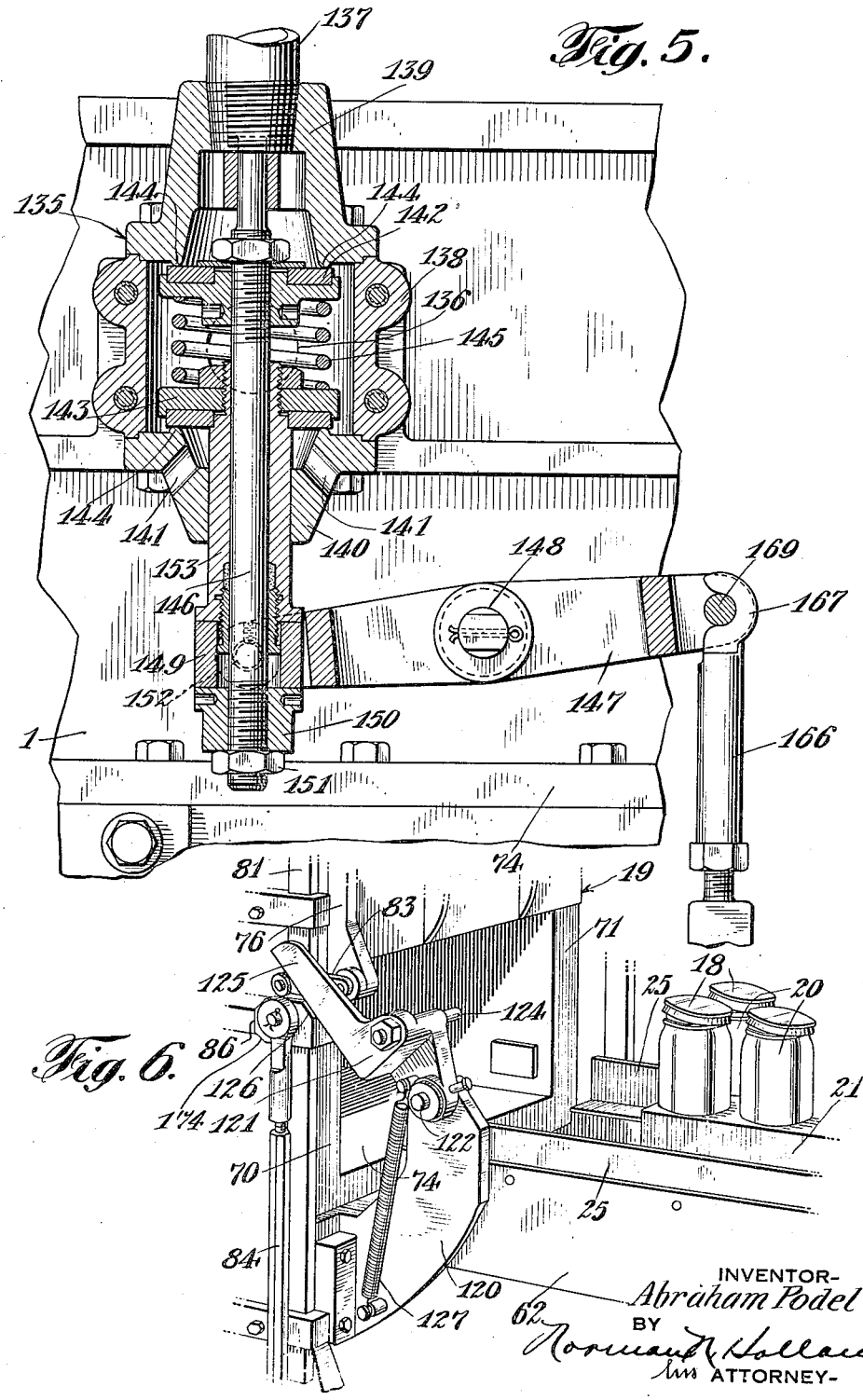

March 30, 1937.                    A. PODEL                    2,075,054
                              SEALING MACHINE
                         Filed Dec. 29, 1933          8 Sheets-Sheet 8
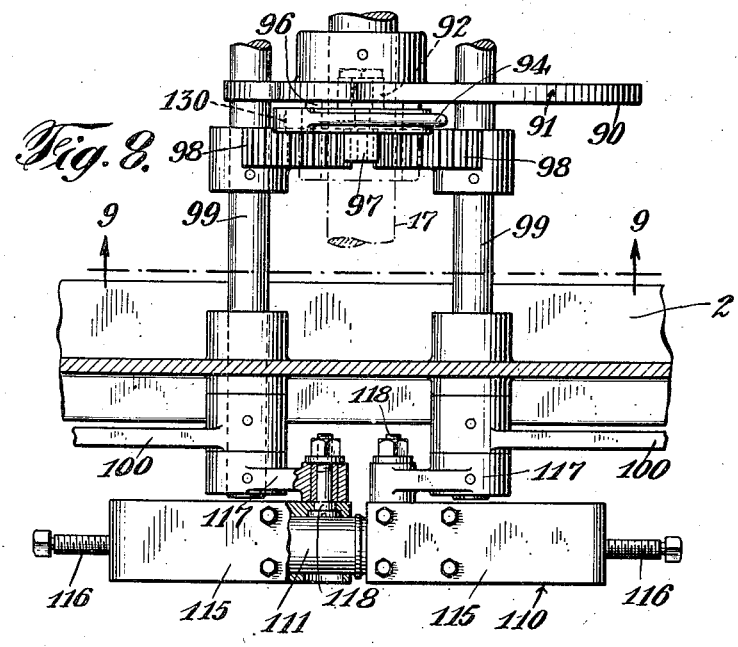
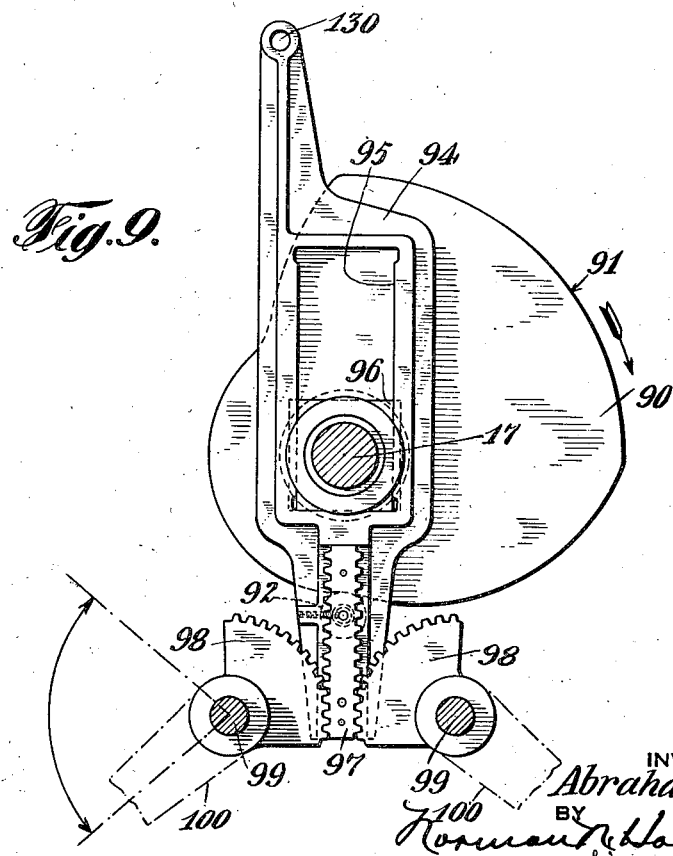
INVENTOR-
Abraham Podel
BY
Norman N. Holland
his ATTORNEY- Patented Mar. 30, 1937

2,075,054

UNITED STATES PATENT OFFICE 2,075,054

SEALING MACHINE

Abraham Podel, New York, N. Y., assignor to Anchor Cap & Closure Corporation, Long Island City, N. Y., a corporation of New York Application December 29, 1933, Serial No. 704,487

13 Claims. (Cl. 226—82)

The present invention relates to sealing machines, and more particularly to a machine for sealing a plurality of closures to containers simultaneously.

Various types of sealing machines have been provided for sealing caps to containers. Some of these seal containers fed by hand one at a time, others seal containers presented in groups. With these existing machines the labor required in presenting and removing the containers as well as in operating the machines is substantial and increases the cost of the packages. Efforts to minimize the labor required have resulted in expensive complicated machines which the ordinary mechanics and machine operators cannot operate properly. In addition, due to limitations in the sealing mechanism and the accuracy required in sealing the containers, a number of the containers are broken; others are sealed imperfectly and the contents spoil. If a sealing machine fails to operate properly, objectionable relays are occasioned and frequently the manufacturer must send out a representative direct from the factory. This is particularly true where the machine is complicated. These and other difficulties have occasioned constant trouble both to the packer and to the cap manufacturer.

The present invention aims to provide a simple, inexpensive sealing machine adapted to overcome the difficulties of existing machines. The present invention also provides a machine which is efficient in operation and which can be readily utilized for forming hermetic seals with or without an internal vacuum, as well as applying other types of closures which do not form hermetic seals. In addition, the present invention contemplates the provision of cooperating mechanisms for presenting the containers in groups to the sealing machine, whereby individual handling of containers is eliminated; and the provision of safety devices to prevent accidental breakage of containers.

An object of the present invention is to provide an inexpensive sealing machine adapted to seal containers more effectively and efficiently than machines heretofore.

Another object of the invention is to increase the speed of sealing caps to containers.

Another object of the invention is to seal a group of packages simultaneously, thereby to decrease the labor required for handling the containers.

Another object of the invention is to provide a machine which forms a better vacuum and subjects a group of containers to a vacuum for a longer period of time without decreasing the speed of operation.

Another object of the invention is to provide a machine wherein a single vacuum is created within a chamber to exhaust air from a group of containers.

Another object of the invention is to provide a machine with automatic features which minimize the labor required for its operation.

Another object of the invention is to provide a machine adapted to seal containers under a vacuum or under atmospheric conditions with the same degree of efficiency.

Another object of the invention is to provide a machine adapted to be rapidly adjusted to seal different sizes of packages.

A further object of the invention is to provide suitable safety devices which insure proper functioning of the various mechanisms to prevent breakage and eliminate improper seals.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a perspective view, illustrating a preferred embodiment of the invention;

Figs. 2 and 2a comprise a fragmentary front elevational view, partly in section, of a preferred embodiment;

Fig. 3 is a rear elevational view, partly in section of the machine;

Fig. 4 and Fig. 4a comprise an end elevational view, partly in section, of the machine;

Fig. 5 is an enlarged fragmentary sectional view of a preferred type of vacuum valve and a safety device for rendering the valve effective;

Fig. 6 is a fragmentary perspective view of a preferred safety device for stopping the trays of containers when the doors of the sealing chamber are closed.

Fig. 7 is an enlarged fragmentary sectional view of a safety device for rendering the transferring device ineffective when resistance to movement of the container trays exceeds a predetermined amount;

Fig. 8 is a fragmentary top plan view, partly in section, of a preferred mechanism for operating the doors of the sealing chamber;

Fig. 9 is a sectional elevational view taken along the line 9—9 of Fig. 8; and

Fig. 10 is an enlarged fragmentary sectional view showing a preferred embodiment of a closure cap adapted to be sealed upon a container by the machine of the present invention.

Described generally, the present machine comprises a base upon which the various parts are mounted. A sealing chamber is provided above the base, wherein a series of sealing chucks are supported which are adapted to move downwardly, as a unit, to seal caps upon containers. The means which support the sealing chucks permit them to be adjusted with respect to the height of the containers to be sealed. Suitable doors are adapted to close the ends of the chamber and a vacuum conduit is periodically connected to exhaust air from the chamber and from the containers prior to the operation of the sealing devices.

Preferably, the containers are fed to the sealing machine arranged in box-shaped trays so that each container, while in the chamber, is underneath one of the sealing chucks. In order to move the trays into the sealing chamber, a supporting table is provided at one end of the table, having a mechanism associated therewith which moves the trays into the chamber at desired intervals. A suitable drive, such as a motor mounted in the base, rotates a plurality of cams which operate the various mechanisms in timed relationship. In the preferred operation of the machine, trays are presented to or removed from the machine either manually or by automatic machinery.

Referring again to the drawings, and more particularly to Figs. 1 to 4a, there is shown a machine having a base 1 formed from suitable castings provided with legs 2 adapted to be bolted to the floor or to any other suitable foundation. At one end of the base, an extension 4 is provided upon which a suitable motor 5 is mounted. Preferably, the motor drives a series of reducing gears (not shown in detail) for rotating a sprocket gear 6, which by means of a chain 7, rotates a sprocket 9 (Fig. 2) mounted on sleeve 10 extending about a shaft 14 (Fig. 4). In order to protect the motor from dust or other foreign substances and to shield the chain, the driven devices are enclosed in a casing 11 (Figs. 1 and 3).

A clutch mechanism 12 (Figs. 1 and 4) is provided at a convenient position on the machine for stopping and starting the machine without stopping the motor. At desired intervals, sleeve 10 by means of the clutch may be made effective to rotate a shaft 14 having a pinion gear 15 thereon, which in turn rotates a gear 16 mounted upon a drive shaft 17. It will be understood that other drives and clutches may be utilized to drive the main shaft 17, if desired.

A suitable sealing chamber 19, which will be described hereinafter, is provided above the base 1 for receiving trays of filled containers 20 having caps 18 loosely placed thereon. A preferred package is shown in Fig. 10 comprising a cap having a bead in the skirt thereof provided with a gasket which is adapted to be forced over the sealing zone of the container by a downward thrust. Preferably, the containers are placed in suitable trays 21 adapted to hold them in upright position and in spaced relation, whereby a group of containers may be conveniently handled and presented to the sealing mechanism. If desired, the trays may be delivered to the chamber by an operator, but to facilitate more rapid handling and to minimize the labor required, an automatic tray feeding device 22 is provided at one end of the machine.

As illustrated more particularly in Figs. 1 and 3, the tray feeding device 22 may comprise a laterally extending table for receiving container trays at one end of the sealing chamber. Preferably, the table comprises a pair of members 25 which form a runway for the trays. The members 25 are secured at one end thereof to the base of the machine, while the other end of each member is secured to a bracket member 26 which is supported by stay rods 27 mounted on the base. In Figs. 2, 3 and 4, preferred means for moving the trays into the chamber are illustrated. These means are operated from the main shaft 17 and, therefore, function in timed relation with the other devices of the machine, and preferably comprise a cam 30 rotatably mounted on shaft 17 and having an eccentric groove 31 therein adapted to receive a roller 32 mounted on a member 34 pivoted to the base 35. A member 36 is connected at one end to member 34 and at its other end to a suitable gear rack 37 mounted on a shaft 39 mounted on the base at 40 (Fig. 4). The upper end of the rack 37 (Fig. 2) is provided with teeth 41 adapted to mesh with a pinion gear 42 rotatably mounted on a shaft 44 below the tray guide. A second gear 45 is mounted on shaft 44 for engaging a gear rack 46 adapted to be reciprocated by operation of the rack 37 operatively connected to the eccentric cam 30. A carriage member 47 (Figs. 3 and 7) having tray engaging fingers 49 thereon is slidably mounted on a pair of rods 50, extending longitudinally beneath the tray guide so that the end of the rack 46 may be attached to the carriage to reciprocate the carriage.

A releasable latch (Fig. 7) is provided between the feed carriage 47 and the reciprocating rack 46 to permit the trays to stop if the doors are closed. Preferably, this latch comprises a member 51 secured to the rack 46 having an enlarged extension 52 at the end thereof adapted to fit into a socket 53 formed by a pair of clamp members 54 and 55. Preferably, the member 54 is bolted to the carriage member 47 at 58 and the member 55 is pivoted thereto at 56, while a suitable spring connection 57, set at desired tension, holds members 54 and 55 together to grip the extension 52. When the rack 46 is moved toward the chamber, the member 51 gripped by the members 54 and 55 moves the carriage 47 forward, whereby the fingers 49 push the tray into the chamber. If movement of the tray is stopped, the extension 52 slips out of the recess 53, whereby the carriage 47 and rack 46 are disconnected and further movement of the carriage ceases. The rack 46 then moves idly forward and, on reverse movement, forces the extension 52 into the latch recess again. To facilitate the entrance of the extension 52 between the latch members and the reengagement thereof, the forward end of the member 55 may be tapered at 59. A further feature of the tray feed is that the fingers 49 are pivoted to the carriage at 60 and are held upwardly by springs 61, which permit slight downward movement of the fingers. In this manner, a tray may be placed between the guide members 25 at their extreme end and pushed inwardly so that the tray rides over the fingers, which yield and move downwardly in response to the weight of the tray. When the tray is in the position shown in Fig. 3, the fingers 49 are moved upwardly again by the springs and are in position to engage the end wall of the tray. If desired, the movable parts of the tray feed may be protected by casing members 62 and 64, shown in Fig. 1.

The sealing chamber 19 (Figs. 1, 3 and 4a) is preferably constructed of a pair of cast side members 70 and 71 secured to the base of the machine, a top portion 72 having a sealing head mounted thereon, and a suitable bottom portion 74 adapted to support the container trays. Guide members 75 may be connected to the inner sides of members 70 and 71 to properly position the tray with respect to the sealing head when the tray is pushed into the chamber. Since it is desired to utilize the present machine for effecting vacuum seals, a pair of vertically movable doors 76 are provided at the ends of the chamber adapted to open and close at intervals to permit the trays to be fed to and removed from the chamber. The doors may be provided with a gasket 77 for sealing the ends of the chamber while the top, bottom and side members form an air-tight construction in which a vacuum may be created.

Preferably, the doors are mounted so that they slide upwardly and downwardly and move toward the chamber upon downward movement, and away from the chamber during upward movement, whereby the gasket will not rub against the ends of the chamber during the operation of the doors and will not be subjected to excessive wear. Preferably, the doors are permitted to move downwardly by gravity to simplify the mechanism for operating the doors. This movement may be accomplished by providing the upper corners of the doors with lugs 79 (Figs. 1 and 2a) having links 80 connected thereto, which are in turn connected to vertical supporting bars 81 slidably mounted in guide portions 82 on the sides of the chamber. The lower corners of the doors are connected to the bars 81 by link members 83 which, together with the links 80, serve to maintain the doors in parallel alignment with respect to the bars 81 and with the ends of the chamber. To effect upward and downward movement of the supporting bars 81, rods 84, operated by a suitable mechanism, about to be described, are connected to the lower ends of the bars. Preferably, extension blocks 86 connect the bars 81 and the rods 84 and provide a support for the lower link members 83. Prior to moving the doors to their lowermost position, the link members 83 are supported on the extension blocks 86 to draw the doors away from the ends of the chamber (Fig. 6). When the doors reach their lower position, the mechanism for operating the doors is effective to move the bars 81 further downwardly to pull the links downwardly and to draw the doors inwardly against the chamber (Fig. 3). When the bars 81 are raised, the blocks 86 support the link members 83 and move the doors away from the chamber.

The mechanism for operating the doors by means of the rods 84 is preferably operated from the main drive shaft 17 and is illustrated more particularly in Figs. 2, 4, 8 and 9. A cam 90 (Fig. 9) is rotatably mounted on the shaft 17 and is provided with a cam surface 91 for engaging a roller 92 mounted on a frame member 94. The frame member 94 has an enlarged rectangular slot 95 therein, wherein a member 96, supported by the shaft 17, is mounted for permitting the frame 94 to slide upwardly and downwardly thereon in response to the cam acting on the roller. The lower portion of the frame is provided with a gear rack 97 adapted to engage a pair of gear segments 98 mounted on the shafts 99 to oscillate the shafts 99 upon movement of the frame 94. The shafts 99, preferably, extend to the sides of the machine so that a suitable bell crank 100 may be mounted on the respective ends of the shafts for raising and lowering each of the rods 84 operating the doors. Since the doors tend to move downwardly by gravity, the rods 84 move the bell cranks 100 downwardly to oscillate the gears to the position indicated in Fig. 9 and to raise the rack 97 and frame 94 upwardly to hold the roller in contact with the cam surface. When the cam moves the roller downwardly, the gear rack on the frame oscillates the gears 98 and bell cranks 100 to raise the rods 84 and lift the dors. The cam has a contour adapted to raise and lower the doors in timed relation with the tray feed mechanism.

In order to stop the downward movement of the doors without subjecting the operating mechanism to undue strains or jars, a shock absorber 110 (Figs. 2 and 8) is operatively connected to the bell crank operating shafts 99. The shock absorber may comprise a cylindrical sleeve 111 having a spring 112 therein and plungers 114 fitting into the sleeve at the ends thereof adapted to compress the spring. A suitable casing member 115 is slidably telescoped about each end of the sleeve 111 and a bolt 116 is threaded therein to engage the plungers 114. Preferably, the bolts 116 are adjustable so that the tension of the spring may be controlled. Each of the casing members 115 is pivoted to a bell crank 117 at 118, while the bell cranks are connected to the shafts 99, so that when the doors move downwardly, the bell cranks 117 slide the casing members 115 on sleeve 111 toward each other, whereby the bolts 116 push the plungers 114 together to compress the spring 112 and to absorb any sudden shocks.

In addition to preventing undue strains on the door operating mechanism, the shock absorber 110 is adapted to pull the doors toward the sealing chamber when the doors are in their lower position. As the doors begin to descend by gravity, the bell cranks 117 extend downwardly to hold the shock absorber below the shafts 99 upon which the bell cranks 117 and 100 are mounted (Fig. 1). The shock absorber spring 112 is then effective to partially resist downward oscillation of the bell cranks 100 which operate the doors. During downward movement of the doors the spring 112 yields gradually so that the bell cranks 100 move downwardly and the bell cranks 117 move upwardly. When the doors are in their lower position, the bell cranks 117 have oscillated upwardly to move the shock absorbing device to a position slightly above the center of the shafts 99 (Fig. 2). The shock absorber spring is now effective to oscillate the bell cranks 117 in the opposite direction to that in which they were being oscillated before they passed the center of the shafts 99. As a result the bell cranks 100 will be oscillated further downwardly. Since the doors are already in their lower position, further downward movement thereof cannot be effected by the bell cranks 100. However, the bell cranks 100 are effective to move the rods 84 and bar members 81 further downwardly, together with the link members 80 and 83 mounted on the bars, which in turn pull the doors inwardly against the sealing chamber.

In Fig. 6, a safety device is illustrated which is adapted to prevent container trays from being pushed against the entrance door when it is closed, which would make it difficult to open the door. The tray feed safety device (Fig. 7) described above prevents any damage. Preferably, the safety device comprises an upwardly extending member 120 mounted on the base and supporting an oscillating stop member 121 pivoted thereto at 122. The stop member 121 is provided with a pin 124 extending inwardly in the path of the trays and an extending arm 125 adapted to fit against a cam portion 126 on the extension block 86. Preferably, a spring 127 is utilized to hold the arm 125 in contact with the cam. When the doors are being closed, the arm 125 moves downwardly with the block 86, placing the pin 124 in the path of the container trays. When the doors are being raised, the arm 125 is also raised and the pin 124 is moved out of the path of the container trays, thus permitting the trays to be moved into the chamber. If the doors should be closed accidentally when a tray is presented, the pin 124 stops the tray and the extension 52 of the feed safety device (Fig. 7) moves out of engagement with the latch members 54 and 55 to render the tray feeding mechanism ineffective as long as the doors remain improperly closed.

The present invention contemplates that the sealing machine may be used for both vacuum seals and seals formed at atmospheric pressure. If the latter type of seal is preferred, the doors need not be closed and are preferably held in their upper position without interfering with the operation of the feed carriage and sealing heads. To accomplish this, a suitable aperture 130 is provided in the door operating frame 94 adapted to register with an aperture 131 in the base of the machine, when the doors are raised, so that a pin or other suitable member 132 (Fig. 1) may be inserted therein to hold the frame in its lower position. In this manner the doors are held up and the roller 92 is held out of contact with the cam 90.

A suitable valve mechanism 135 (Fig. 5) for exhausting air from the sealing chamber to form vacuum seals therein is operatively connected to a port 136 (Fig. 4a) formed in one side of the chamber. The mechanism shown herein serves a threefold purpose. It renders a vacuum line 137 effective to exhaust air from the chamber, it maintains the desired vacuum while the containers are being sealed, and releases the vacuum within the chamber after the sealing operations have been completed. The valve mechanism preferably comprises a casing 138 (Fig. 5) connected to the port 136, an upper member 139 connecting the casing 138 to the vacuum line 137 and a lower member 140 having apertures 141 therein for releasing the vacuum within the chamber. Suitable valve members 142 and 143 are provided in the casing 138 for rendering the vacuum line 137 and the apertures 141 effective respectively at desired intervals. The valve members 142 and 143 are held against suitable valve seats 144 provided on the upper and lower members 139 and 140 by means of a spring 145 to normally close the vacuum line 137 and the apertures 141. In order to render the vacuum line effective, a rod 146 is threaded into engagement with the upper valve member 142. The rod 146, in turn, is operatively connected to an oscillating arm 147 pivoted to the outer side wall of the chamber at 148. To connect the arm 147 and the rod 146 a sleeve member 149 is slidably mounted on the rod and is retained thereon by a bushing 150 and a nut 151. The oscillating arm 147 is pivoted to the sleeve member 149 at 152. In this manner downward movement of the sleeve 149 will move the rod 146 and valve member 142 downwardly to open the vacuum line. Upon upward movement of the sleeve 149 the rod 146 and valve member 142 are moved upwardly by means of the spring 145 to close the vacuum line. The lower valve member 143 is secured to a sleeve member 153 slidably mounted on the rod 146 above the sleeve 149. When the sleeve 149 moves upwardly it abuts against the sleeve 153 and raises the valve member 143 to make the vacuum release apertures 141 effective. When the sleeve 149 moves downwardly the spring 145 is effective to hold the valve member 143 downwardly against the valve seat 144 to close the apertures 141.

The oscillating arm 147 may be operated by any suitable mechanism, but preferably a cam 160 (Fig. 1) mounted on the main drive shaft 17 is provided for this purpose. The cam is provided with a groove 161 for receiving a roller 162 mounted on an arm 164 pivoted to the base of the machine at 165, and the arm, in turn, is connected to a rod 166. The rod 166 is provided with a hook-shaped portion 167 (Fig. 5) for engaging a pin 169 on the arm 147 at desired intervals.

Suitable devices are provided for connecting the rod 166 and the arm 147 only when the doors are closed, whereby the vacuum valve cannot be operated when the doors are open. These devices may comprise a lever 170 (Figs. 1, 2, and 2a) pivoted to the side wall of the chamber at 171, and a link member 172 connecting the lower end of the lever 170 to the rod 166. The lower end of the lever 170 is provided with a cam portion 175 adapted to be engaged by a cam portion 174 on the block extension 86 operatively connected to the door 19 (Fig. 6). When the doors are closed the cam portion 174 engages the cam portion 175 and oscillates the lever 170 toward the valve operating arm 147 to move the hook portion 167 into engagement with the pin 169, thereby operatively connecting the valve operating arm 147 to the cam 60. The upper end of the lever 170 is provided with a roller 173 adapted to ride on the side of the door operating bar 81 and a cam recess 88 is formed on the side of the bar 81 (Fig. 2a) for receiving the roller 173. When the doors are closed the roller extends into the recess to permit the cams 174 and 175 to oscillate the lever 170. When the doors are raised the cam recess 88 is effective to oscillate the lever 170 away from the arm 147 and move the hook portion 167 out of engagement with the pin 169. If the doors should be closed improperly or should be locked in their raised position, the door operating bar 81 is effective to hold the lever 170 and rod 166 away from the arm 147 to prevent connection to vacuum.

If desired, a vacuum gauge 177 may be connected to the chamber at 178 to indicate vacuum or absolute pressure within the chamber when the vacuum means are effective. A petcock 179 is provided for shutting off the gauge when it is not desired to register. Likewise, if no vacuum is required, the vacuum line may be shut off by a hand valve 176.

A sealing mechanism for applying caps to containers and adapted to operate in timed relation with the feeding devices and exhausting mechanism is shown particularly in Figs. 1, 2a, 3, and 4a. The casting 72, (Fig. 4a) which forms the top of the sealing chamber 19, is provided with a plurality of collars 180, preferably four in number, wherein slidable rods 181 are inserted for supporting a sealing head 182. A suitable packing 184 held in position by suitable means as shown may be utilized for maintaining an airtight seal between the collars 180 and rods 181 to prevent air from leaking into the vacuum chamber. The sealing head preferably comprises a plate 185 provided with apertures 186 adapted to receive bolts 187 for securing flange members 189 and suitable sealing chucks or anvils 190 thereto. The bolts are provided with an enlarged portion 188 for permitting the chucks to be slidably supported thereon and to laterally adjust themselves. As shown in Fig. 4a, suitable apertures 191 and recesses 192 are provided in the plate member 185 and members 189 above the center of each chuck 190 for receiving resilient members 195 adapted to compensate for irregularities in the adjustments or in the sizes of the individual containers. A member 196, having a socket portion 197 is mounted in the aperture 191, and the upper portion of the chuck is provided with a corresponding socket portion 199 adapted to receive a ball member 200. In this manner, when the chucks press downwardly on a cap, they may yield slightly, due to the resilient members 195 which are effective through the ball and socket connection. The collar portions on the bolts permit slidable adjustment of the chucks and the ball and socket connections cooperate therewith to properly position the chucks with respect to the sealing head. In order to prevent marring of the cap, the chucks 190 are provided with members 201 of felt, soft rubber or other suitable material, attached thereto by means of bolts 202.

The members 189 not only provide means for attaching the chucks 190, but also provide a suitable connection for mounting the head on the supporting rods 181. Preferably, the members 189 are provided with a flange portion 205 forming a groove 206 for receiving a projecting portion 207 on the ends of the rods 181, whereby the sealing head may be withdrawn by sliding portions 207 through the grooves 206. In order to secure the rods within the grooves to prevent accidental sliding of the plate member, suitable members 209 (Fig. 3) are inserted into the grooves at the respective ends of the plate member and are held therein by means of a washer 210 or other member attached to the plate member by bolts 211.

Since the present invention contemplates sealing a number of containers simultaneously, it will of course be understood that the number of chucks or anvils 190 corresponds with the number of containers in the tray. Likewise, the chucks are properly arranged so that a chuck is above each container. If desired, the entire sealing head may be quickly removed and another substituted.

The rods 181, which suspend the sealing head, are supported and moved upwardly and downwardly by a suitable device shown in detail in Figs. 2a, 3 and 4a, which comprises a casting 220, having four collars 221 thereon for receiving the upper ends of the rods 181. Preferably, the rods 181 are mounted in the collars by means of a sleeve 222 fitting into the collars and about the rods. Each sleeve is rotatably connected by a flange portion 224 and a bushing 225 fitting above the collar, and is provided with a threaded inner portion 226 adapted to receive an upper threaded portion 227 of the rods 181. In this manner rotation of the sleeve 222 will raise or lower the rod to adjust the height of the sealing head with respect to the containers to be sealed. Suitable bushings 229, at the upper end of the rods, prevent the rods from being moved too far downwardly and out of engagement with the threaded portion of the sleeve.

In order that the four supporting rods 181 may be raised or lowered as a unit, to keep the sealing head level, a suitable sprocket member 230 is keyed to each of the sleeves 222 which is held thereon by a bushing 231, and a sprocket chain 232 operatively engages each of the sprockets. Preferably, the chain is rotated by means of a sprocket 234 mounted on a shaft portion 236 rotatably connected in a bearing portion 237 of the casting 220. The upper end of the shaft 236 is provided with a head 239 adapted to be engaged by a wrench or crank 240 (Fig. 2a) whereby rotation of the shaft 236 rotates the sprocket 230 operatively connected by the chain 232 to raise or lower the rods 181 simultaneously and adjust the height of the sealing head.

In order to operate the sealing heads, the casting 220 is raised and lowered at desired intervals by a mechanism operating in timed relationship with the other devices of the machine. Preferably, this is effected by providing the casting with a stub shaft 245 at each side thereof having a roller 246 at the end thereof fitting into a vertical slot 247 formed in a frame casting 249 mounted on the chamber. A link member 250 is keyed to the stub shaft 245 and a second link member 251 is pivoted thereto, which in turn is keyed to a rock shaft 252 rotatably supported in bearing portions 254 of the frame 249. Preferably, the shaft 252 extends across the top of the machine so that a pair of links 250 and 251 may be connected thereto at both ends to raise or lower the casting 220 in response to oscillation of the shaft.

To oscillate the shaft 252, an arm member 260 is keyed thereto at one of the free ends thereof, preferably at the side of the machine opposite the location of the vacuum valve and drive clutch mechanism (Fig. 3). A link member 261 connects member 260 to a bell crank 262 pivoted on the frame casting 249 at 264, while a suitable connecting rod 265 is operatively connected to the bell crank 262 at 266. Preferably, the rod 265 is connected by means of a spring device 263 adapted to absorb shocks when the sealing head mechanism is operated. This device may comprise (Fig. 4) a sleeve 267 connected to the crank 262 having the upper end of the rod 265 extending therethrough and a spring 269 telescoped about the rod and held thereon by a washer 270 and a nut 271. The rod 265 is provided with nuts 272 forming an extension beneath the sleeve 267, whereby upward movement of the rod moves the sleeve positively upwardly to lower the sealing head, while downward movement of the rod will compress the spring 269 and move the sleeve downwardly to raise the sealing head.

Preferably, the rod 265 is operated by an arm 274 connected thereto at 275 (Fig. 3), which is pivoted to the base of the machine at 276 and is provided with a roller 277 adapted to ride in a suitable cam groove. As illustrated herein, a cam groove 279 may be provided in the gear 16 (Fig. 4) mounted on the main drive shaft 17 or otherwise, a suitable cam (not shown) may be mounted on the shaft adjacent to the gear 16. In this manner, the above described mechanism for operating the sealing head is operated in timed relation with the other devices operated from the main drive shaft 17.

The sealing devices described above are particularly adapted for sealing caps upon containers requiring a downward thrust to force the gasket over the sealing zone (Fig. 10). The present invention, however, is not limited to this type of closure. If desired, other sealing devices may be utilized, for example, sealing devices which reform the skirt of the cap to apply it to the container.

In the operation of the machine, adjustments are made for the height of the sealing head with respect to the containers to be sealed and adjustments are made for closing the doors to operate the vacuum valve. It is then advisable to first turn the machine over by hand through at least one cycle to see that all parts move freely. This may be done by placing a crank 290 (Fig. 4) over the substantially square end 291 of the shaft 14, moving the clutch 12 into operative position and rotating the crank 290. After the crank is removed, a tray having filled containers therein with caps supported thereon may then be placed on the tray feed table and the motor may be started to operate the main drive shaft 17. The cam 30 will be effective to operate the feed carriage, whereby the tray will be placed into the chamber and, if desired, the doors will close. As soon as the doors are closed, the vacuum valve is operative to form a vacuum in the chamber and remove air from the containers. When the desired vacuum has been effected, the sealing head is operated in timed relation to bring the chucks downwardly upon the caps and seal them to the containers. As the caps are sealed, the sealing head moves upwardly, the vacuum is released by the vacuum valve, and the doors are raised whereby the tray may be removed at one end while another tray is fed to the chamber by means of the carriage. If the doors are closed accidentally, the safety stop blocks the tray and causes the carriage to be released from the feed rack. Likewise, if the doors do not close, the vacuum valve is not operated. If it is desired to seal the containers at atmospheric pressure, the doors may be locked in their upper position by inserting the member 132 into the aperture 131 in the base and the aperture 130 in the door operating frame. If different sizes of containers are to be sealed, the height of the sealing head may be adjusted or the sealing head may be replaced to accommodate caps having different diameters.

It will be seen that the present invention provides an improved sealing machine which is adapted to seal containers in a chamber, either under a vacuum or at atmospheric pressure. Means are provided for rendering the vacuum effective only when the chamber is closed. Suitable feeding devices present a number of containers in trays automatically, whereby a plurality of containers are sealed simultaneously. The feeding devices operate at frequent intervals and cooperate with the sealing means to effect rapid sealing of the container in an efficient and effective manner. A further feature of the invention is that safety devices prevent improper feeding of containers, whereby breakage is eliminated. The manual labor required is reduced to a minimum, since the groups of containers may be handled conveniently in the trays; likewise, the operating costs are very small due to the fact that a single source of power operates the entire machine. In addition, the machine may be rapidly adjusted for any desired size of container or cap to be sealed thereon. The machine is rugged in construction, simple in operation, and can withstand the rough usage to which it may be subjected.

As various changes may be made in the form, construction and arrangement of parts without departing from the spirit and scope of the invention and without sacrificing its advantages, it is to be understood that all matter herein is to be interpreted as illustrative and not in a limiting sense.

Having thus described my invention I claim:

1. In combination with a sealing machine for sealing a plurality of containers, members at one end of the sealing machine for supporting a tray having containers therein, a pair of guide members extending along the length of said supporting members, a carriage slidably mounted on said guide members for engaging the tray, a clutch device connected to said carriage, a member for reciprocating said carriage operatively connected to said carriage by means of said clutch device, and means for reciprocating said member operatively connected to said carriage, whereby said carriage is adapted to move the tray toward said sealing machine, said clutch being effective to disconnect said reciprocating member and carriage if resistance to the movement of the tray is substantial.

2. In a sealing machine the combination of a slidable carriage for presenting trays to a sealing mechanism, a member mounted on said carriage for engaging the trays, a clutch device connected to said carriage having a recess therein, a member engaging said clutch recess, and means for moving said member to move said carriage and present said trays, said member being adapted to be released from said clutch recess when movement of the trays is prevented.

3. In a sealing machine, the combination of means providing a sealing chamber having open ends for moving a tray therein, doors for closing said open ends, means for operating said doors, means for moving a tray having containers thereon into one of said open ends, and a clutch for disconnecting the tray moving means from its drive to render it ineffective when the doors are closed.

4. In a sealing machine, the combination of a chamber having open ends, doors for closing said open ends, means for operating said doors, means for moving a tray having containers therein into said chamber, a member extending into the path of the tray when said doors are closed to stop the movement of the tray, and a clutch associated with said tray moving means and responsive to pressure thereon for preventing further movement of said tray when said tray engages said member.

5. In a sealing machine, the combination of a sealing chamber having open ends, doors for closing said open ends, a cam operatively connected to said doors for raising said doors, said cam being adapted to permit said doors to drop by gravity, and shock absorbing means operatively connected to said doors for stopping the downward movement of the doors.

6. In a sealing machine, the combination of a chamber having open ends, doors for closing said chamber, means for raising and lowering said doors, means for operatively connecting said chamber to a vacuum creating device when said doors are closed, a sealing head in said chamber for sealing a plurality of containers, means for maintaining said doors in their upper position to render said door operating means ineffective, and means for rendering said vacuum connecting means ineffective when the doors are in their upper position.

7. In a sealing machine, the combination of a chamber having open ends, doors for closing said chamber, means for operating said doors, means for presenting a plurality of containers to said chamber, means for operatively connecting said chamber to a vacuum line, sealing devices in said chamber for sealing caps upon containers, means for maintaining the doors in their open position without stopping operation of the sealing device and the container presenting means, and means for rendering the vacuum connecting means ineffective while the doors are held open without interfering with the operation of the presenting means and the sealing devices.

8. In a sealing machine, the combination of a chamber having open ends, doors for closing said ends to make said chamber air-tight, means for operating said doors, a vacuum line, a valve connected to said chamber and said line for creating a vacuum in said chamber, means for operating said valve in timed relation with said doors, and means operatively connected to said last means and one of said doors to render said last means ineffective when the doors are not closed.

9. In a sealing machine, the combination of a chamber, doors for opening and closing said chamber, a bell crank operatively connected to each of said doors, a shaft for mounting each of said bell cranks, a second bell crank connected to each of said first bell cranks and mounted on said shaft, and a shock absorbing means connected to said second cranks, said shock absorbing means being adapted to be moved by said second bell cranks above and below said shafts whereby said shock absorbing means are effective to exert a force in one direction upon said first bell cranks when the shock absorbing means are below the shafts and effective to exert a force in an opposite direction when the shock absorbing means are above the shafts 10. In a sealing machine, the combination of a chamber, doors for closing said chamber, means for mounting said doors, means operatively connected to said doors and mounting means for spacing said doors from said chamber, means for raising and lowering said mounting means to raise and lower said doors, and means for moving said mounting means further downwardly when the doors are in their lower position to move said doors inwardly toward said chamber.

11. In a sealing machine, the combination of a chamber having open ends, a pair of substantially vertically slidable doors for opening and closing said ends, means for raising said doors simultaneously, said means being effective to permit said doors to slide downwardly simultaneously by gravity into closed position, and a shock absorbing means operatively connected to both of said doors for permitting both of said doors to simultaneously slide downwardly gradually.

12. In a sealing machine, the combination of a chamber having open ends, doors for closing said ends, means for raising and lowering said doors, means for moving the doors transversely towards said ends after the doors are in their lower position to securely hold the doors against said ends and seal the chamber, a vacuum line, a valve operatively connected to said line and said chamber, and means for operating said valve in timed relation with said door operating means, said valve being effective to create a vacuum when said doors are in closed position and effective to release the vacuum in the chamber before the doors are raised.

13. In a sealing machine, a sealing head comprising in combination, a plate member, members connected to said plate member for connecting it to supporting members, a plurality of sealing chucks, means for connecting said chucks to said plate member, a ball and socket connection between each of said chucks and said plate member adapted to permit said chucks to move with respect to said plate member to facilitate adjustment of chucks upon containers, and resilient means between each of said ball and socket connections and said plate member.

ABRAHAM PODEL.